Sept. 10, 1929. E. S. BARTLETT 1,727,330
SHEEP SHEAR
Filed July 19, 1926
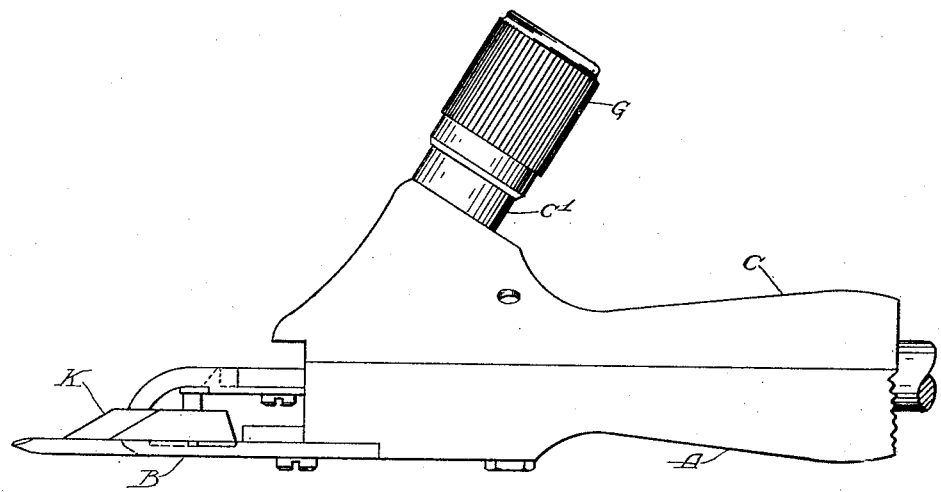
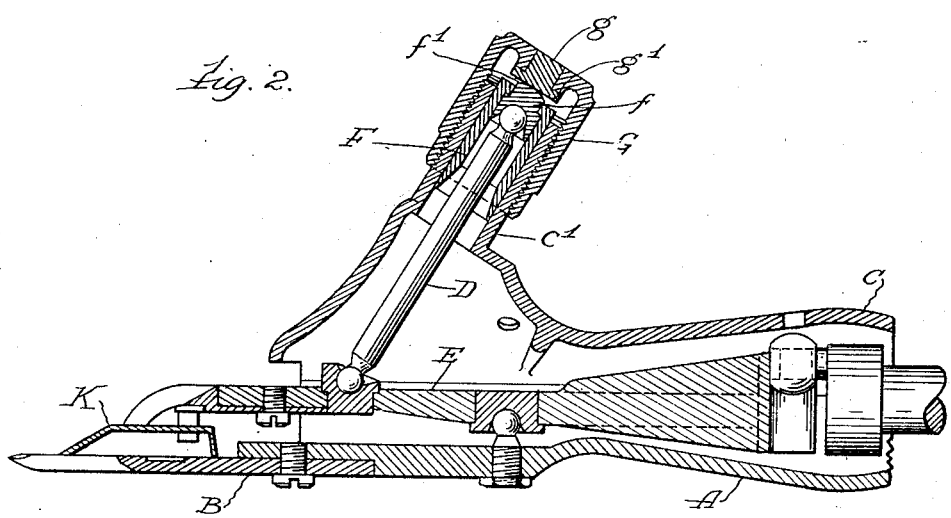

Patented Sept. 10, 1929.

1,727,330

UNITED STATES PATENT OFFICE.

EDWIN S. BARTLETT, OF FOREST PARK, ILLINOIS, ASSIGNOR TO CHICAGO FLEXIBLE SHAFT COMPANY, OF CHICAGO, ILLINOIS, A CORPORATION OF ILLINOIS.

SHEEP SHEAR.

Application filed July 19, 1926. Serial No. 123,294.

The purpose of this invention is to provide an improved construction in respect to sheep shears having what is commonly called a "dolly pin" for stressing the vibrating cutter onto the fixed cutter to avoid the liability which has been experienced in previous constructions of the rotation of the nut by which the upper end of the dolly pin is stopped, by reason of the oblique stress of the dolly pin upon said nut due to the oscillation of the lower end of the dolly pin, and thereby to obviate or reduce the necessity for means for locking said nut. It consists in the elements and features of construction shown and described as indicated in the claims.

In the drawings:—

Figure 1 is a side elevation of a sheep shear embodying this invention.

Figure 2 is a vertical section thru the center of Fig. 1.

In the drawing the body or casing of the sheep shear is shown comprising the hand hold member, A, to which the comb or fixed cutter, B, is attached fixedly, and the cover member, C, which comprises the housing, $C^1$, for the dolly pin, D, which is seated at its lower end upon the lever, E, by which the vibrating cutter, K, is actuated. The construction as involving the parts thus far mentioned is shown in a familiar conventional form. In the common construction hitherto employed, as above mentioned, the dolly pin is seated at its upper end directly on the head of the cap nut screwed onto the housing, $C^1$. In the construction shown there is provided a sleeve, F, which is telescopically fitted in the housing, $C^1$, said sleeve having its upper end closed by a fixed seat member, $f$, for the upper end of the dolly pin. This seat is conveniently made in a separate piece, as shown, so that it may be properly finished, hardened and tempered, but for the purpose of the invention it may be considered as a unitary part of the sleeve to which it is permanently secured by drive fit. The upper end of the housing is exteriorily threaded as in customary construction for receiving the cap nut, G, the thread being co-axial with the telescopic seat of the sleeve and with the cavity of the sleeve. The head of the cap nut is interiorily finished to afford a flat seat, $g^1$, for the upper end of the sleeve which is furnished with a co-operating seat, $f^1$ formed on the seat member, $f$, both said seats being directly transverse to the common axis of the nut and the sleeve, the seat, $f^1$, being preferably slightly rounded. For the same reason that the head of the sleeve which forms the seat for the upper end of the dolly pin is desirably made as a separate piece and fitted permanently to the sleeve, the head of the cap nut is formed in part by a drive-fitted central plug, $g$, which affords the flat seat above mentioned for the upper end of the sleeve.

Upon considering this construction it may be understood that the oblique stress of the dolly pin against the seat at its upper end which results from the oscillation of the dolly pin at its lower end by reason of its engagement with the vibrating-cutter-actuating lever, is exerted upon the sleeve, F, and is not transmitted from the sleeve to the nut, because the sleeve by its telescopic fit in the housing can experience no tilting or lateral shifting movement from this oblique thrust of the dolly pin. It will be understood that from this circumstance it results that said oblique thrust has no tendency to start the nut from the position to which it may be adjusted for properly stressing the vibrating cutter upon the fixed cutter. By this means it will be understood that there is avoided any necessity for the means usually employed for locking the nut, as by a ratchet dog or the like. It may be observed also that the parts are dimensioned so that the dolly pin at its upper end terminates slightly below the upper limit of the threaded portion of the housing. This feature is desirable as a further precaution against any stress which might be transmitted through the sleeve to the nut, tending to disturb the latter; for it may be understood that if the point of application of the thrust of the dolly pin upon the sleeve were above the zone of the threaded engagement of the nut with the housing, and if by reason of any looseness of the sleeve this thrust might be transmitted in the oblique direction of a dolly pin at either limit of its oscillation, the distance from the upper end of said threaded engagement to the point of application of the thrust of the dolly pin would constitute leverage in favor of the thrust for affecting the nut with a tendency to rotate it.

I claim:—

1. In a sheep shear or the like, in combination with a vibrating cutter, an actuating lever therefor, a dolly pin by which it is stressed for holding the movable cutter in shearing relation to the fixed cutter, and a casing member which houses the dolly pin, a sleeve fitting telescopically in said housing and into which the upper end of the dolly pin extends, said sleeve having at its upper end a seat for the upper end of the dolly pin and being interiorly diametered for accommodating the oscillation of said dolly pin, a cap nut screwed onto the upper end of the housing having its head interiorly fitted for engaging the upper end of said sleeve, one of said engaging parts being convexly formed to provide an antifrictional bearing.

2. In a sheep shear or the like, in combination with a vibrating cutter, an actuating lever therefor, a dolly pin by which it is stressed for holding the movable cutter in shearing relation to the fixed cutter, and a casing member which houses the dolly pin, a sleeve fitting telescopically in said housing and into which the upper end of the dolly pin extends, said sleeve having at its upper end a seat for the upper end of the dolly pin and being interiorly diametered for accommodating the oscillation of said dolly pin, a cap nut screwed onto the upper end of the housing having its head interiorly fitted for engaging the upper end of said sleeve, one of said engaging parts being convexly formed for limited contact with the other substantially at the axis of the cap nut for the purpose indicated.

In testimony whereof, I have hereunto set my hand at Chicago, Illinois, this 15 day of July, 1926.

EDWIN S. BARTLETT.